W. H. SAWYER.
LOG CHUTE AND ENTRANCE.
APPLICATION FILED DEC. 1, 1916.
1,290,668.
Patented Jan. 7, 1919.
3 SHEETS—SHEET 1.
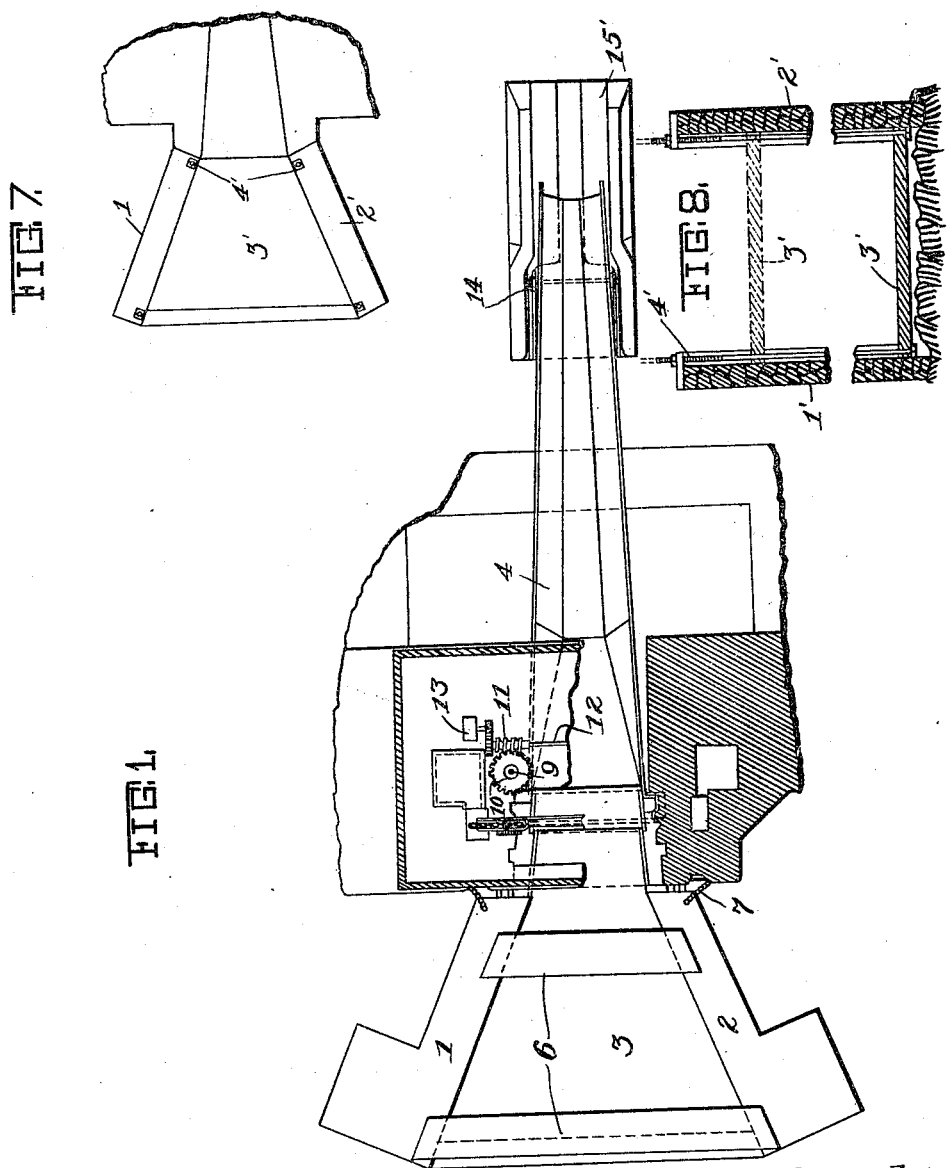
Inventor:
Walter H. Sawyer
By
Attorney W. H. SAWYER.
LOG CHUTE AND ENTRANCE.
APPLICATION FILED DEC. 1, 1916.
1,290,668.
Patented Jan. 7, 1919.
3 SHEETS—SHEET 2.
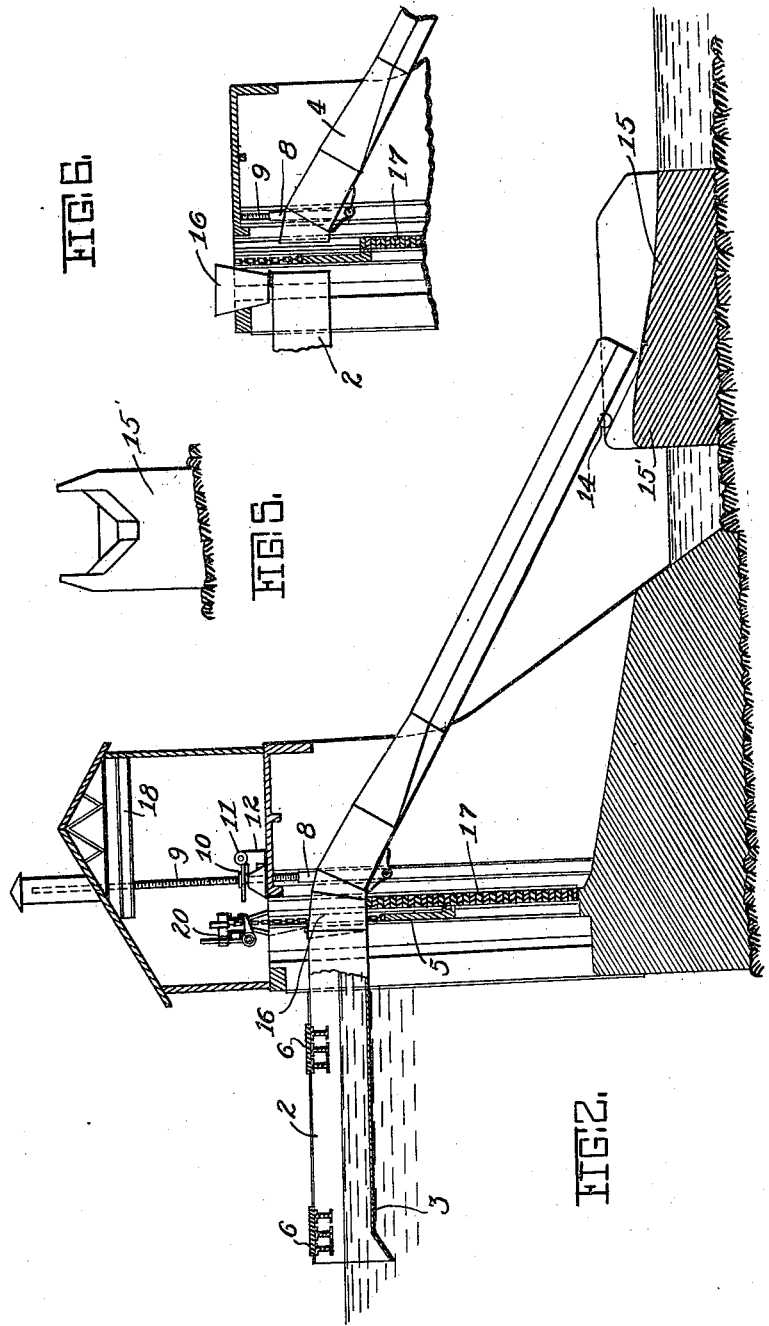
Inventor:
Walter H. Sawyer
By
Attorney

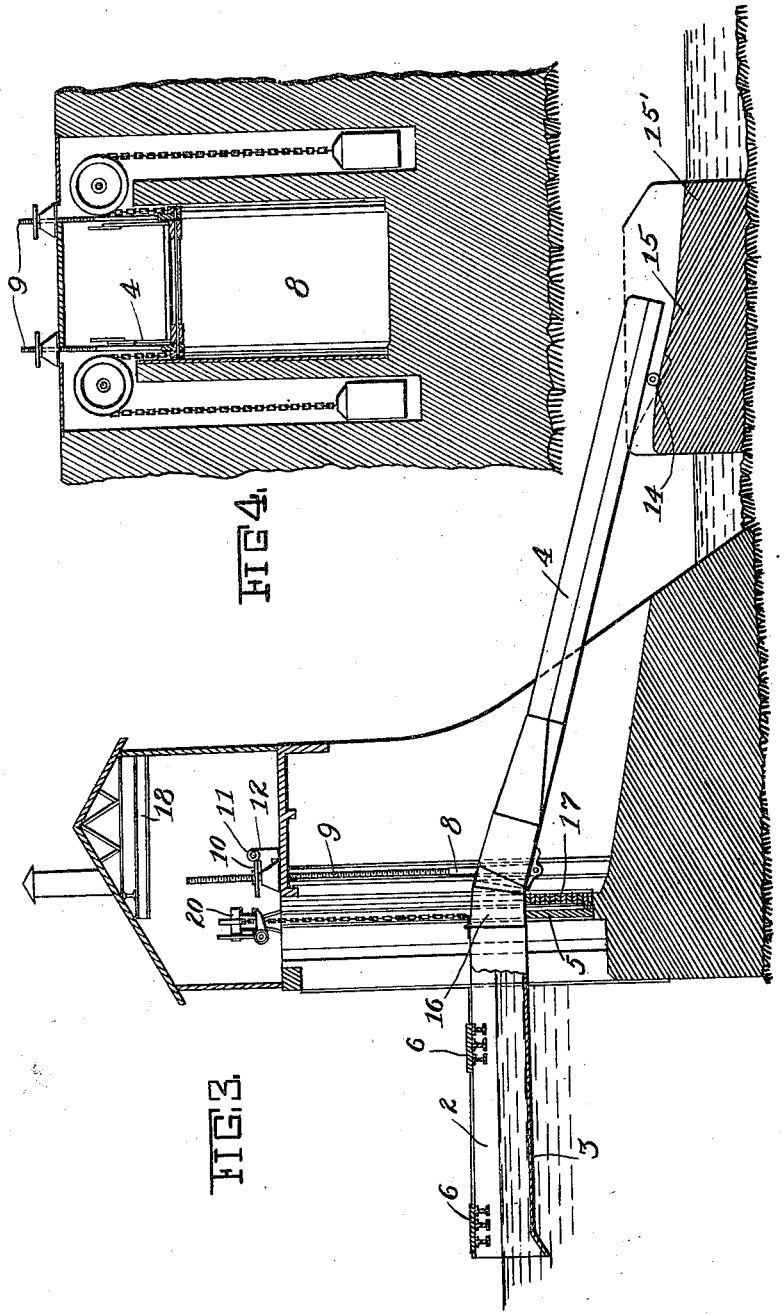

UNITED STATES PATENT OFFICE.

WALTER H. SAWYER, OF AUBURN, MAINE.

LOG CHUTE AND ENTRANCE.

1,290,668.  Specification of Letters Patent.  Patented Jan. 7, 1919.

Application filed December 1, 1916. Serial No. 134,281.

*To all whom it may concern:*

Be it known that I, WALTER H. SAWYER, a citizen of the United States, residing at Auburn, county of Androscoggin, State of Maine, have invented certain new and useful Improvements in Log Chutes and Entrances, of which the following is a specification.

This invention relates to log handling structures, and particularly to structures for making possible and facilitating the driving of logs through dams. In the driving of logs through dams certain factors enter into and seriously complicate the problem of rapidly and economically passing the logs through the dam. Aside from the unwieldly character of the logs themselves, the variation in the water level during the log driving season and the effects produced upon the logs by the currents created when the sluice is opened as well as the matter of the depth of the water itself in the sluice are all factors which must be carefully considered in the erection of a dam intended to handle logs. Moreover, each dam presents problems peculiar to itself in respect to such elements as size, capacity, natural limitations, etc.

In the driving of logs through those dams used to impound stored water adapted to be drawn upon for the purpose of maintaining the flow of a river at or near a uniform rate, the level in the reservoir or lake so formed varies considerably with the season of the year and the requirements of the developed water powers below the dam. It has been proposed to provide such dams with numerous gates having sills at various elevations in order that logs may be driven through the dam at different elevations of the impounded water, but this construction is expensive and not always feasible.

In the driving of logs through a dam on a river where no wide reservoir is found immediately above the dam, the mere opening of gates creates a current in the river which tends to carry the logs to the sluice, but if the dam controls a still pond or lake, the effect of operating gates is only local because the current created by the opening of the gates is confined to the immediate vicinity of the gates and has little or no effect in carrying the logs toward the sluice, so that the logs must be pulled or pushed into the immediate entrance of the sluice. With either dam, such current as is created by the opening of the gates has certain common characteristics, of which the lateral contractions at the head of the sluice and the bottom contraction at the bottom of the sluice are predominant. The lateral contractions of the current at the sluice head tend to restrict the effective intake opening of the sluice and the bottom contraction of the current tends to retard the entrance of the logs. The effect of these contractions is to create water conditions which make for log jams, with the incidental increased time, and labor in driving the logs.

The object of my invention is to provide a log chute and log chute entrance for a dam which will reduce the labor in driving the logs through a sluice; which will materially increase the capacity of the sluice so that more logs may be handled in less time, and with less labor than in sluices as at present constructed; and which will enable the velocity of the water and thus of the logs toward the entrance of the sluice proper to be accelerated and the logs automatically straightened so as to rapidly pass through the sluice parallel to the sides of the sluice.

In carrying out my invention I provide an adjustable sluice entrance which may be adapted to the varying level of the impounded water and which has a form designed to produce an induced current and a consequent automatic straightening and accelerative tendency of the logs, and an adjustable sluice which may be adjusted to correspond to the position of the sluice entrance. Between the sluice entrance and sluice, I locate a movable connecting section which may be moved out of the way of the sluice gate without interfering with the adjustment of the sluice itself when it is desired to operate the gate.

The construction and operation of my invention together with an illustrative embodiment thereof, is fully disclosed in the specification which follows. Throughout the specification and drawings like reference characters are correspondingly employed, and in the drawings:—

Figure 1 is a plan view of a portion of a dam equipped with my invention.

Fig. 2 is a vertical longitudinal section thereof and showing the sluice entrance and sluice adjusted to a relatively high water level.

Fig. 3 is a similar view showing the parts adjusted to a lower water level.

Fig. 4 is a detail section of the adjustable support for the upper end of the sluice.

Fig. 5 is a detail view of the support for the lower end of the sluice.

Fig. 6 is a detail view of the hinged coupling section between the sluice proper and the sluice entrance, and showing the open position thereof, and Figs. 7 and 8 are detail views of a modified form of sluice entrance.

The sluice entrance of my invention shown in Figs. 1 to 6 inclusive, consists of a pontoon embodying two floating members 1 and 2 on either side of a submerged bottom section 3. The lateral members 1 and 2 are widely separated at the up-stream end and gradually converge toward the mouth of the sluice itself 4. The effect of the gradually converging sides is to provide an induced current in the impounded water when the control gate 5 of the sluice is open. This induced current has a gradual acceleration due to the gradually converging sides of the sluice entrance and its effect is to gradually bring the logs up to the entrance of the sluice proper 4 from a very slow motion to a rapid motion and at the same time automatically straighten the logs so that they float substantially parallel to the sides 1 and 2 and to the sides of the sluice 4.

The side members 1 and 2 above the water line carry platforms 6 on which the men who arrange the logs for passage through the sluice may work and on which machinery may be installed for the purpose of pulling the logs toward the pontoon. The members 1 and 2 may be secured to the masonry of the dam in any suitable manner, as by the anchor bars and chains 7 shown in Fig. 1.

The bottom member 3 of the pontoon may be maintained at any level or the pontoon may be lowered at either end by means of any suitable ballast. I thus provide a sluice entrance consisting of a floating portion gradually narrowing from the up-stream end to the sluice proper which not only automatically adjusts itself to variations in the level of the impounded water, but gives to the impounded water and thus the logs a gradually increasing acceleration from entrance to delivery and this acceleration automatically straightens the logs so that they float parallel to the sides of the pontoon and are rapidly carried through the dam and along the sluice 4.

As a modification, the sluice entrance may be constructed as shown in Figs. 7 and 8 wherein the flaring side members $1^1$ and $2^1$ are concrete or other abutments fixed in the river bed and the bottom member $3^1$ is adjustable therebetween by any suitable hoisting mechanism as the screw rods $4^1$.

The sluice 4 itself consists of a trough-shaped chute adjustably supported at each end upon the masonry of the dam. At its upper end the sluice is substantially rectangular in cross-section and gradually decreases in width toward its lower end and terminates in a contracted discharge throat. This progressive decrease in area is not only more economical than a sluice of uniform width throughout, but the sluice of gradually decreasing area has a pronounced advantage over other forms in that the depth of water in the sluice may be maintained nearly uniform. By decreasing the sluice area as the velocity of the water increases, I am enabled to work with less water head and with less liability of the logs jamming in the sluice because of the nearly uniform depth of the water throughout. The increased depth of water at the down stream end of the sluice exerts an increased buoyancy on the lower ends of the logs, tending to lift the logs from the bottom of the sluice, and launch them more nearly horizontal. Usually the log enters the sluice without any substantial initial velocity and as it tips into the inclined sluice straightens itself out somewhat before acquiring its full speed down the incline. As the log descends, it acquires momentum, which gives it a diving impulse at the discharge end of the sluice. This impulse is counteracted by the lifting effect imparted to the leading end of the log by reason of the increased depth of water at the discharge end of the sluice. The log is thus automatically righted and has free and rapid exit, thus not only increasing the efficiency of the drive but reducing the liability of jamming.

The upper end of the sluice rests upon a vertically adjustable counterweighted support 8 guided in suitable ways in the masonry of the dam and in the embodiment shown, raised and lowered by a pair of screws 9 having gears 10 meshing with worms 11 on a worm shaft 12 which is geared to and rotated by a motor 13 located in the deck house of the dam.

The lower end of the sluice rests upon a wheeled truck 14 which runs on an inclined track 15 formed in the masonry of an independent pier $15^1$ placed down stream from the dam and allows the lower end of the sluice to find its position according to the position to which the upper end has been adjusted. The upper face of the supporting abutment for the lower end of the sluice is developed on a curve as best shown in Figs. 2 and 3 whereby to prevent the logs upending as they discharge from the sluice. Between the upper end of the sluice 4 and the pontoon is hinged a vertically swingable section 16 in the form of a plurality of telescoped elements constituting a movable entrance for the sluice. The section 16 is supported upon a series of superposed stop logs 17 guided in suitable grooves in the masonry of the dam and adapted to be removed and replaced by any suitable hoisting mechanism according to the level at which it is desired to support said section. The stop logs may be used to fill the sluice opening in the dam when it is desired to raise a head of water, or to remove when the water level has been reduced. As here shown, the deck house contains a track 18 for a trolley which carries suitable tackle for removing and replacing the stop logs.

The gate 5 of the sluice is guided in ways formed in advance of the stop logs and is adapted to be raised and lowered by any suitable hoist 20 located in the deck house. In the raising and lowering of the gate, the section 16 is thrown back on its pintle out of the way of the gate to allow the gate to rise and fall. (See Fig. 6). The hinged section 16 therefore allows the gate to be operated without disturbing the adjustment of the sluice and at the same time is capable of positioning to accord with the adjustment of the sluice to variations in the level of the impounded water as indicated by the pontoon.

Various modifications in the form and construction of my device may obviously be resorted to within the limits of the appended claims.

What I therefore claim and desire to secure by Letters Patent is:

1. In combination, a dam, a chute adjustably supported relative thereto, and an entrance for said chute comprising flaring side members and a submerged bottom member, said chute having a variable position as to its bottom member vertically of said dam.

2. In combination, a dam, a chute adjustably supported relative thereto, and an entrance for said chute mounted for variable position vertically of said dam.

3. In combination with a dam having a sluice opening, a sluice adjustable in said opening, and a sluice entrance for said sluice having variable positions vertically of said dam according to the level of the impounded water.

4. In combination, a dam having an adjustable sluice, an adjustable sluice entrance, and a coupling section between said sluice entrance and adjustable vertically of the dam.

5. In combination, a dam having an adjustable sluice, an adjustable sluice entrance, and a coupling section between said sluice and sluice entrance adjustable vertically of the dam and having a vertical swinging movement.

6. In combination, a dam having an adjustable support for a chute at one end and a fixed support for the chute at its other end, and a chute supported on said adjustable support and slidable on said fixed support, and an adjustable entrance for said chute.

7. In combination, a dam having an adjustable support for a chute at one end and a fixed support for the chute at its other end, and a chute supported on said adjustable support and slidable on said fixed support.

In testimony whereof I affix my signature in presence of two witnesses.

WALTER H. SAWYER.

Witnesses:
EDWARD H. DELANO,
FRANK M. CUMMINGS.

Copies of this patent may be obtained for five cents each, by addressing the "Commissioner of Patents, Washington, D. C."